UNITED STATES PATENT OFFICE.

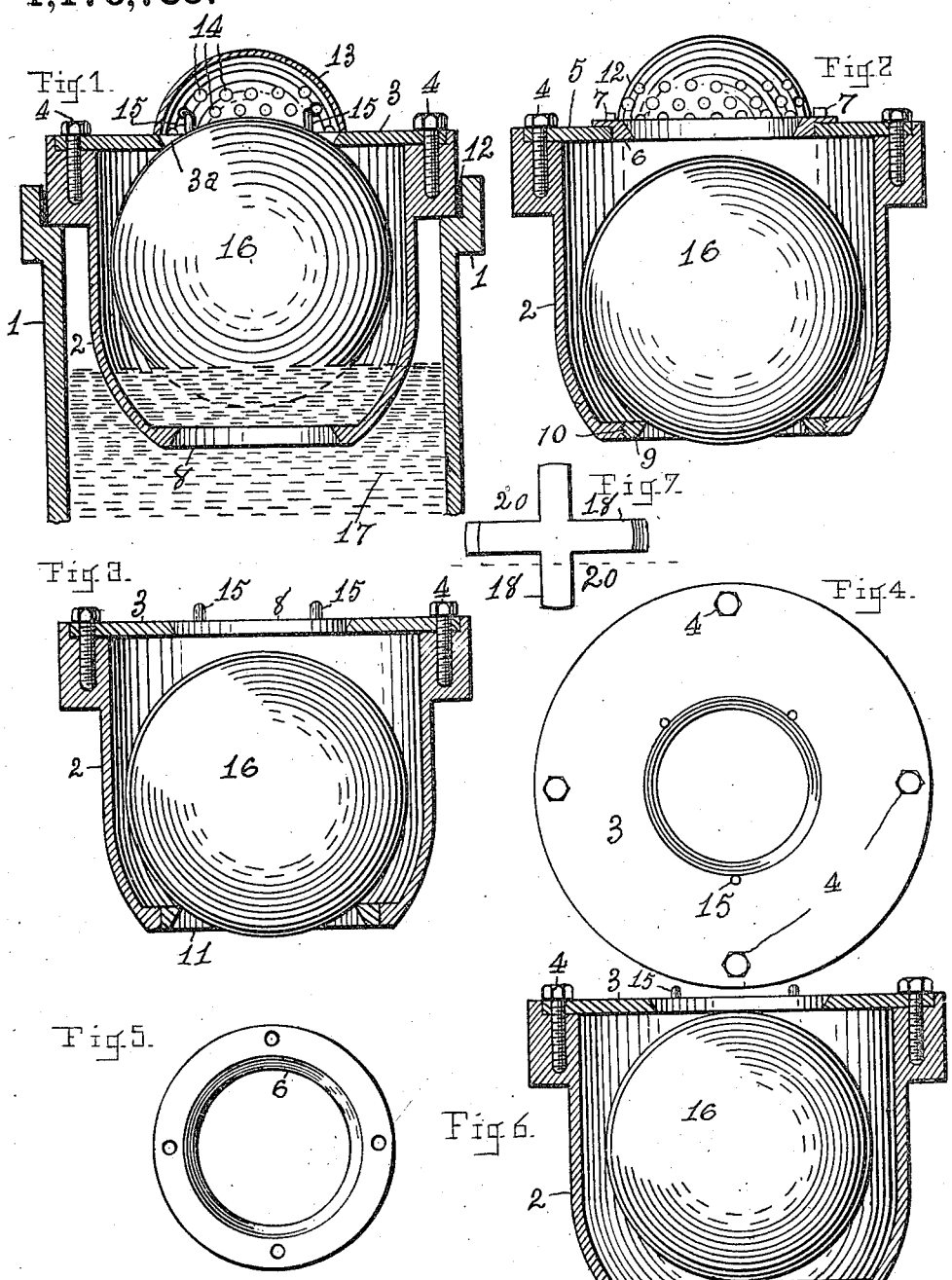

RICHARD R. STIELOW, OF NEENAH, WISCONSIN.

VALVE.

1,176,785.　　　　Specification of Letters Patent.　　Patented Mar. 28, 1916.

Application filed June 21, 1915. Serial No. 35,424.

*To all whom it may concern:*

Be it known that I, RICHARD R. STIELOW, a citizen of the United States, residing at Neenah, in the county of Winnebago and State of Wisconsin, have invented a new and useful Valve, of which the following is a specification.

My invention relates to a back water and sewer gas preventing valve and is designed to be applied to the upper end of a sewer pipe in the cellars of buildings for preventing the entrance into the cellar of water by reason of an overflowed sewer pipe, and also, for preventing the entrance into the cellar of sewer gas by reason of the evaporation of the water in the sewer trap, or, its absence for any other reason, and the object of the improvement is, to form a valve for such purposes with the fewest number of parts consistent with the results it is designed to accomplish. In doing this, the valve cage which is provided with imperforate side walls, is made to serve as a basket cage when the sewer gas excluding valve seat at the lower end of the cage is not required, by the attachment of a valve supporting member in place of the valve seat, whereby all of the advantages of an open walled cage are retained while using an imperforate side walled valve cage that is required for excluding gas.

The device in its most simple form, comprises a ball valve, a valve cage having a valve seat integral therewith upon its lower end, a detachable flat plate having a valve seat integral with it upon its upper end, a plurality of bolts for securing said plate to the valve cage and a loosely mounted hood over said last named valve seat. Said device and several of its modifications are shown in the accompanying drawing, in which,—

Figure 1 is a vertical section through a fragment of sewer pipe with a valve cage suspended from the flanged end of the pipe and with a spherical valve in elevation within the cage. Fig. 2 is a vertical section of a valve cage having a valve in elevation within the cage similar to that in Fig. 1, but having modifications in its valve seats and its hood being in elevation. Fig. 3 is a vertical section of a similar cage and valve as in Fig. 2, its lower valve seat being secured to the cage in a different manner from that in Fig. 2 and its hood being omitted. Fig. 4 is a plan of the valve seat plate at the upper end in Figs. 1, 3 and 6. Fig. 5 is a plan of the valve seat at the upper end in Fig. 2. Fig. 6 is a vertical section of a similar cage and valve as in Fig. 3 with its valve seat opening in its lower end supplied with a valve supporting member. Fig. 7 is a plan of said valve supporting member.

Similar numerals and letters indicate like parts in the several views.

1, indicates the flanged end of a piece of sewer pipe; 2, a valve cage in Figs. 1, 2, 3 and 6; 3, a circular flat plate and 3ª, a valve seat integral therewith; 4, tap bolts for securing the plates to the cage; 5, a plate similar to the plate 3, but having a larger central aperture, shown in Fig. 2 for use with a detachable valve seat of a non corrodible metal, while the plate 5 may be of cast iron; 6, a ring valve seat adapted for being secured within the central aperture in the plate 5 with bolts 7.

8, is a valve seat integral with the cage in Fig. 1.

9, is a valve seat secured to the lower end of the cage in Fig. 2, by means of threads 10.

11, is a valve seat secured to the lower end of the cage in Fig. 3 by shrinking the aperture in the cage around the ring valve seat. It should be noted that the several designs of valve seats are rings of a suitable metal, their inner edges being similar while their outer edges may be of different form and diameter, and are adapted for use at either end of the cage. Each valve seat presents an angular edge to the valve and is what may be termed a non cutting edge, and will effectually exclude gas, notwithstanding the valve is of very light weight. The several methods of securing the valve seats in position, namely, by bolts, by screw threads and by shrinking the cage around the valve seat ring, may be used at either end of the cage. The cage is to be placed within the sewer pipe as is shown and may have a packing 12, inserted for forming an air and water tight joint. A hood 13, is mounted over the upper valve seats which is provided with apertures 14, for the passage of air and water, it being held in position loosely, by means of studs 15, which may be integral with the plates 3. When the plate 5 is used instead of the plate 3, the hood can be held in position by the heads of the bolts 7.

16, is a spherical buoyant valve and may be formed of rubber, or be of any suitable material that is in a slight degree compressible and will form a floatable valve.

I make no claim to forming any part of the device of any particular material, but the valve seats if made of a non corrodible metal will produce more satisfactory results. When the valve is in its normal position upon the valve seat, it will exclude sewer gas from a cellar, and when water 17, raises the valve against the upper valve seat, no water can pass into the cellar.

As it sometimes occurs, there is no necessity for the sewer gas excluding feature, and in order to save the cost of the machine work in forming the lower valve seat, while still using a cage with imperforate side walls, a valve supporting member 18, in the present case in the form of a cross, is secured within the opening as with the bolts 19, which are tapped into the cage. The holes for the bolts 19 are near the edge of the opening in the cage and the heads of the bolts are sufficiently large for extending under the outer flange of the piece 18 and supporting the same. This member may be a rough casting, as may be the valve seat opening for receiving it and no particular form is essential, only that it supports the valve and is provided with openings as 20, around the cross shaped member through which water can escape from the cage to the sewer.

Having described my invention, what I claim and desire to secure by Letters Patent, is,—

1. A back water and sewer gas valve adapted for application to the vertically arranged sewer pipe of a cellar drain, comprising a spherical buoyant valve therefor, a bowl shaped receptacle having an open top, imperforate side walls and a circular opening through its lower end, a flat plate having a circular opening centrally thereof across the upper end of the receptacle and bolted thereto, a valve seat having an acute angular non-cutting edge arranged around the opening in said plate and in position for the engagement of said non-cutting angular edge with the valve and a valve seat having a like angular edge arranged around the opening through the lower end of the receptacle in a position for supporting the valve upon said edge.

2. A back water and sewer gas valve adapted for application to the vertically arranged sewer pipe of a cellar drain, comprising a spherical buoyant valve therefor, a bowl shaped receptacle having an open top, imperforate side walls and a circular opening through its lower end, a flat plate having a circular opening centrally thereof across the upper end of the receptacle and bolted thereto, a valve seat having an acute angular non-cutting edge arranged around the opening in said plate and in position for the engagement of said non-cutting angular edge with the valve and a valve seat of a like form and position relative to the engagement of its angular edge with the valve detachably connected with the opening through the lower end of the receptacle.

3. A back water and sewer gas valve adapted for application to the vertically arranged sewer pipe of a cellar drain, comprising a spherical buoyant valve therefor, a bowl shaped receptacle having an open top, imperforate side walls and a circular opening through its lower end, a flat plate having a circular opening centrally thereof across the upper end of the receptacle and bolted thereto, a valve seat having an acute angular non-cutting edge arranged around the circular opening through the lower end of the cage and in position for the engagement of said non-cutting angular edge with the valve and a valve seat of like form and position relative to the engagement of its angular edge with the valve, detachably connected to the opening through said flat plate.

4. A back water and sewer gas valve adapted for application to the vertically arranged sewer pipe of a cellar drain, comprising a bowl shaped receptacle having an open top and bottom and an imperforate side wall, a spherical buoyant valve, a valve seat therefor having an acute angular non-cutting edge arranged in the open top and in a position for the engagement of said acute angular edge with the valve, and a detachable valve supporting member secured within the open bottom of the receptacle.

5. A back water and sewer gas valve adapted to be applied to the vertically arranged sewer pipe of a cellar drain having a buoyant valve therefor, a bowl shaped receptacle having an open top, imperforate side walls and an opening through its bottom, a flat plate within said open top, said plate having an opening, a valve seat for said valve arranged upon the plate within said flat plate having an acute angular non-cutting edge in position for the engagement of said angular edge with the valve, a valve seat below the valve having a similar seat similarly arranged relative to the valve and an inverted bowl shaped and perforated hood loosely mounted over said receptacle.

6. A back water and sewer gas valve adapted to be applied to the vertically arranged sewer pipe of a cellar drain, having a spherical buoyant valve therefor, a bowl shaped receptacle having an open top, imperforate side walls and an opening through its bottom, a flat plate over the open top, having an opening, a valve seat, having an acute angular non-cutting edge arranged in the opening in the plate and in position for the engagement of said acute angular edge with the valve, a valve seat below the valve having a similar seat similarly arranged relative to the valve, and an inverted bowl shaped and perforated hood loosely mounted over said receptacle.

RICHARD R. STIELOW.

Witnesses:
 CLARA M. ALBEE,
 LIZZIE NICHLOS.